US012601331B1

(12) United States Patent
Xu et al.

(10) Patent No.: US 12,601,331 B1
(45) Date of Patent: Apr. 14, 2026

(54) ADDITIVELY MANUFACTURED COMPONENTS FOR ELECTRIC PROPULSION THRUSTERS

(71) Applicant: Board of Trustees of the University of Alabama, for and on behalf of the University of Alabama in Huntsville, Huntsville, AL (US)

(72) Inventors: Kunning Gabriel Xu, Brownsboro, AL (US); Sydney D. Miller, Murfreesboro, TN (US)

(73) Assignee: Board of Trustees of the University of Alabama, for and On Behalf of The University of Alabama in Huntsville, Huntsville, AL (US)

( * ) Notice: Subject to any disclaimer, the term of this patent is extended or adjusted under 35 U.S.C. 154(b) by 148 days.

(21) Appl. No.: 18/181,326

(22) Filed: Mar. 9, 2023

(51) Int. Cl.
| | |
|---|---|
| *F03H 1/00* | (2006.01) |
| *B29C 64/118* | (2017.01) |
| *B29C 64/364* | (2017.01) |
| *B33Y 70/10* | (2020.01) |
| *B33Y 10/00* | (2015.01) |
| *B33Y 80/00* | (2015.01) |

(52) U.S. Cl.
CPC .......... *F03H 1/0075* (2013.01); *B29C 64/118* (2017.08); *B29C 64/364* (2017.08); *B33Y 70/10* (2020.01); *B33Y 10/00* (2014.12); *B33Y 80/00* (2014.12)

(58) Field of Classification Search
CPC ......... B33Y 10/00; B33Y 50/02; B33Y 70/10; B33Y 80/00; B29C 64/118; B29C 64/364; F03H 1/0075
See application file for complete search history.

(56) References Cited

U.S. PATENT DOCUMENTS

| | | | |
|---|---|---|---|
| 6,215,124 | B1 | 4/2001 | King |
| 6,612,105 | B1 | 9/2003 | Voigt et al. |
| 7,500,350 | B1 | 3/2009 | Jaconsen et al. |
| 7,624,566 | B1 | 12/2009 | Manzella et al. |
| 9,934,929 | B1 | 4/2018 | Martinez et al. |
| 11,346,330 | B1 | 5/2022 | Xu et al. |

(Continued)

FOREIGN PATENT DOCUMENTS

EP          0778415 B1     12/1996

OTHER PUBLICATIONS

Sydney Miller ALPIP Student Presentation (Year: 2014).*

(Continued)

*Primary Examiner* — Vishal I Patel
(74) *Attorney, Agent, or Firm* — Jon E. Holland; Butler Snow LLP

(57) ABSTRACT

A Hall effect thruster is provided having one or more components fabricated using additive manufacturing techniques. Additive manufacturing can be used to fabricate the magnetic flux guide and the discharge channel of the thruster. In addition, the propellant distributor for the thruster can be incorporated into the base of the discharge channel. The magnetic flux guide can be fabricated with a filament impregnated with a magnetic material and the discharge channel can be fabricated with a filament impregnated with a ceramic material. Permanent magnets can be positioned in the magnetic flux guide at locations that surround the discharge channel.

7 Claims, 9 Drawing Sheets

(56) References Cited

U.S. PATENT DOCUMENTS

2013/0200219 A1    8/2013  Marchandise
2016/0265517 A1    9/2016  Goebel

OTHER PUBLICATIONS

Miller, "Miniature Hall Thruster Using Ceramic and Iron Impreg-
nated 3D Filaments," University of Alabama in Huntsville, pp. 1-7.
Colorado State University (CSU) "Hall Effect Thrusters," 2016.
Klahn, "Design Guidelines for Additive Manufacture Snap-Fit
Joints," 2016.
Xu, et al., "Perspectives, frontiers, and new horizons for plasma-
based space electric propulsion," Physics of Plasmas, 2020, pp.
1-30, 27.
Raitses, et al., "Cylindrical Hall Thrusters with Permanent Mag-
nets," Journal of Applied Physics, 2010, pp. 1-26, 108.
Meeker, "Finite Element Method Magnetics," 1998, pp. 1-161,
Version 4.2.

* cited by examiner

ADDITIVELY MANUFACTURED COMPONENTS FOR ELECTRIC PROPULSION THRUSTERS

STATEMENT REGARDING FEDERALLY SPONSORED RESEARCH OR DEVELOPMENT

This invention was made with Government support under contract OIA 1655280 awarded by the National Science Foundation. The Government has certain rights in the invention.

BACKGROUND

The present application generally relates to electric propulsion thrusters, such as a Hall effect thruster, that can have one or more components built using additive manufacturing (or 3D printing) techniques.

The two dominant types of electric propulsion thrusters currently in use that can produce very high specific impulses are Hall effect thrusters and gridded ion engines. Hall effect thrusters can be further broken down into ones that use electromagnets and one that use permanent magnets. The main difference between the two types of Hall effect thrusters is the power consumption, which is higher for thrusters designed with electromagnets.

For Hall effect thrusters with permanent magnets, there are two main design components: the metal flux guide and the discharge channel. The discharge channel can experience high heat and requires a material that will not melt or deform while the thruster is in operation. The metal flux guide can typically be a solid piece of machined iron or low-carbon steel that has ferromagnetic properties. In traditional subtractive manufacturing, the fabrication of the metal flux guide and discharge channel can incur significant cost and manufacturing time and can limit the ease of getting newly designed thrusters for testing. The additive manufacturing (or 3D printing) of the metal flux guide and the discharge channel of the Hall effect thruster would permit faster development and testing of thruster designs. However, the metal flux guide and the discharge channel of the Hall effect thruster cannot typically be made via low-cost polymer additive manufacturing since the standard plastic filaments used in additive manufacturing would not withstand the high temperatures of the discharge channel nor would the plastic filaments provide the ferromagnetic properties needed in the metal flux guide.

SUMMARY

The present application generally pertains to electric propulsion thrusters that can have one or more components of the thruster fabricated using additive manufacturing. More specifically, the present application pertains to a Hall effect thruster with a magnetic flux guide and a discharge channel that are fabricated using additive manufacturing (or 3D printing) techniques. The magnetic flux guide can be printed with iron impregnated PLA (polylactic acid) filaments and the discharge channel with ceramic impregnated PLA filaments. In addition, in order to print the magnetic flux guide and the discharge channel with the impregnated filaments, specific changes or alterations to certain printer settings (e.g., cooling fan settings, flow rate, retraction speed, nozzle temperature, air gap distance and/or printing speed) are implemented to avoid warping and/or deformations in the magnetic flux guide and the discharge channel.

The Hall effect thruster (or other electric propulsion thruster) with additively manufactured components can be designed and applied to small satellites (or sats), e.g., CubeSats, large spacecraft, and/or major telecommunications or science satellites. Additively manufacturing the thruster can also allow in-space fabrication and assembly of a thruster system, which can be beneficial for automated or crewed space exploration.

An advantage of the present application is a simplification of the process for creating and testing Hall effect thrusters, thereby providing flexibility when experimenting with new thruster designs.

Another advantage of the present application is that selected components of Hall effect thrusters can be fabricated with fast turnaround and high availability processes.

A further advantage of the present application is that multiple geometries for selected components of the Hall effect thruster can be fabricated and investigated that would be cost prohibitive to manufacture using traditional methods and materials.

Still another advantage of the present application is the availability of a wider range of thruster design options as a result of additive manufacturing that may provide for new and unique component level and thruster level designs and configurations.

Other features and advantages of the present application will be apparent from the following more detailed description of the identified embodiments, taken in conjunction with the accompanying drawings which show, by way of example, the principles of the application.

3

Wherever possible, the same reference numbers are used throughout the drawings to refer to the same or like parts.

DETAILED DESCRIPTION

Figure 1:
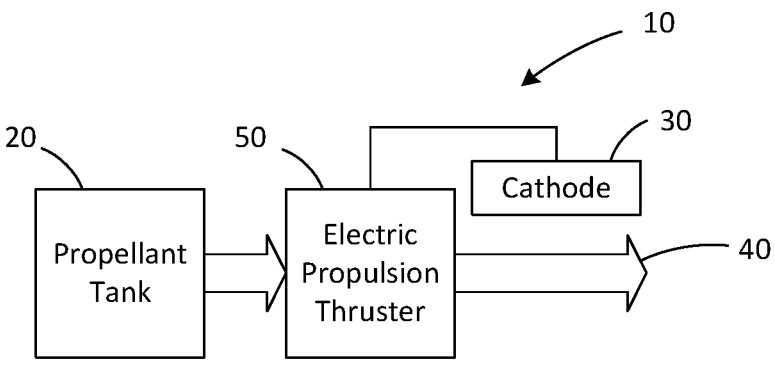
FIG. 1 is a block diagram of an embodiment of a propulsion system.

FIG. 1 shows an embodiment of a propulsion system. The propulsion system 10 can include a propellant tank 20 that stores a propellant. In one embodiment, the propellant can be a noble gas such as Xenon or Krypton, but other propellants can be used in other embodiments. The propellant tank 20 provides the propellant to an electric propulsion thruster 50, which generates plasma or ions 40 that provide the thrust for the propulsion system 10. In one embodiment, the thruster 50 can be a stationary plasma thruster (SPT) type Hall effect thruster, but other configurations of electric propulsion thrusters (e.g., a magnetoplasmadynamic (MPD) thruster, a gridded ion engine or an annular ion engine (AIE)) can be used in other embodiments. In the embodiment shown in FIG. 1, a cathode 30 can be electrically connected to the thruster 50 and may receive propellant from the propellant tank 20. The cathode 30 can be an electron source used in the generation of the plasma 40 in the thruster 50. While the cathode 30 is shown separate from the thruster 50 in the embodiment of FIG. 1, the cathode 30 may be incorporated into the thruster 50 in other embodiments. In still other embodiments, the cathode 30 may not be required depending on the type of electric propulsion thruster 50 used in the propulsion system 10.

Figure 2:
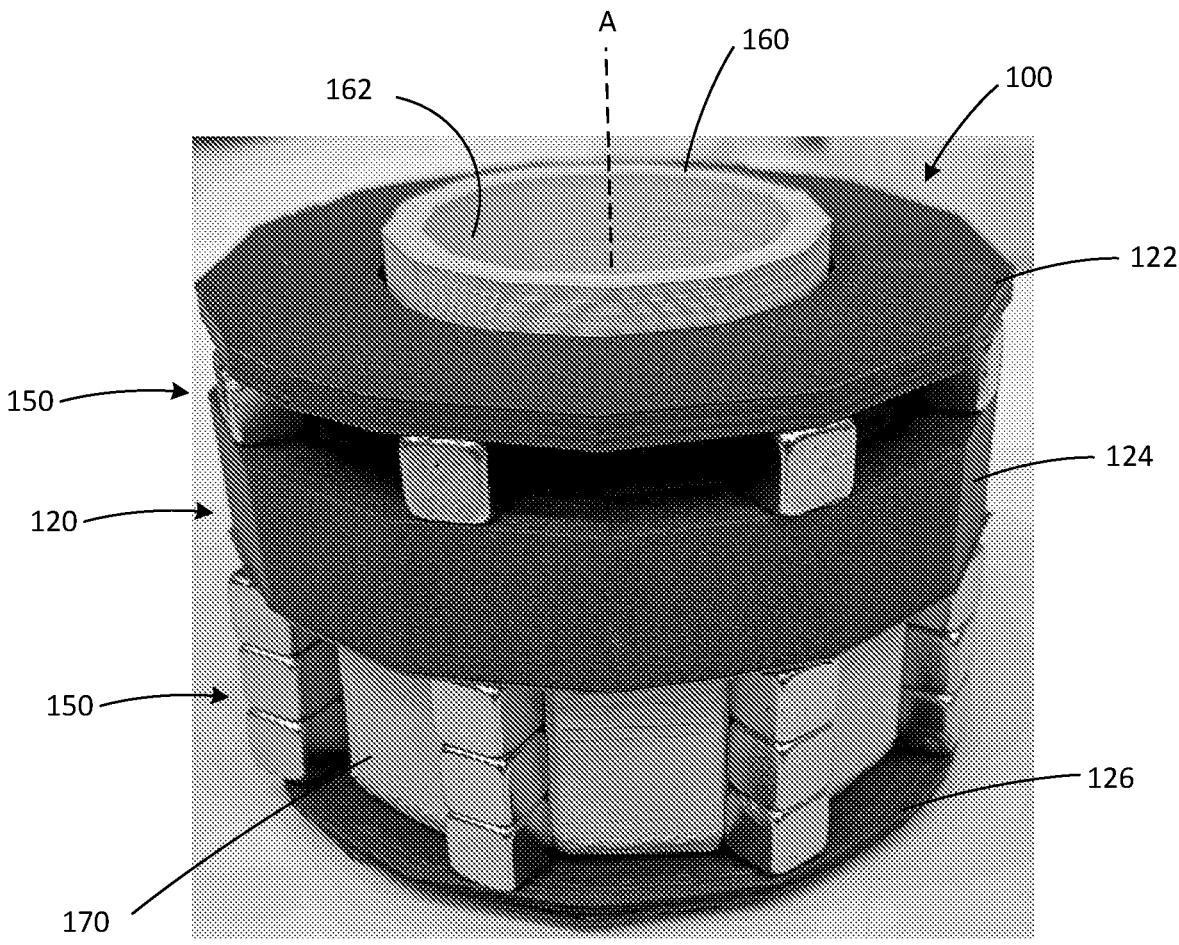
FIG. 2 is a perspective view of an embodiment of a Hall effect thruster.
Figure 3:
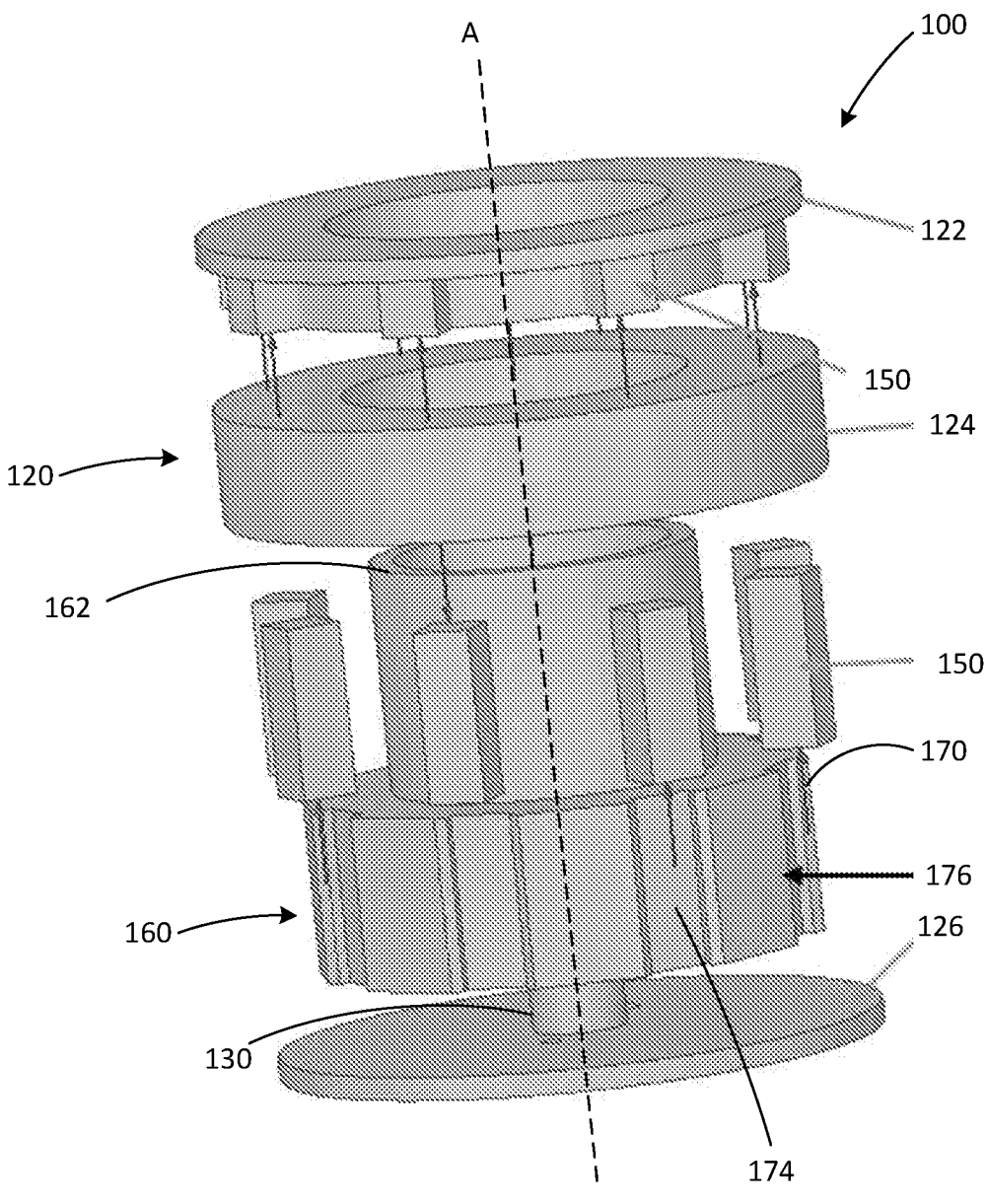
FIG. 3 is an exploded view of the Hall effect thruster of FIG. 2.
Figure 4:
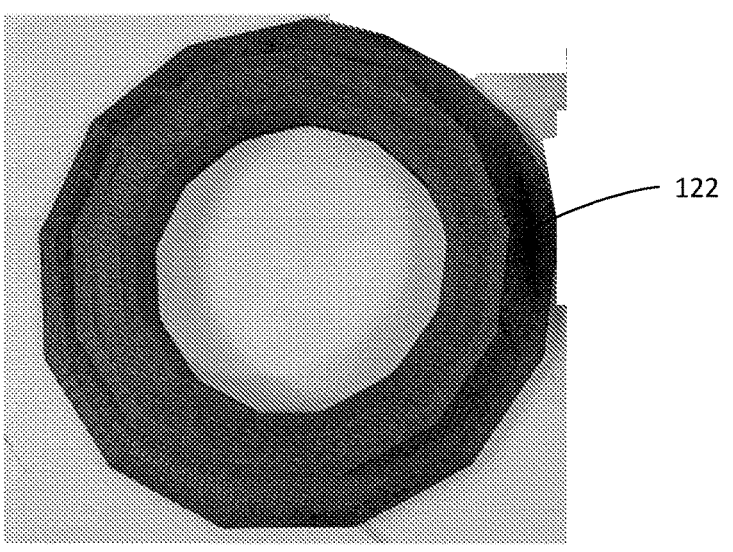
FIG. 4 is a bottom view of the upper component of the flux guide of FIG. 3.
Figure 5:
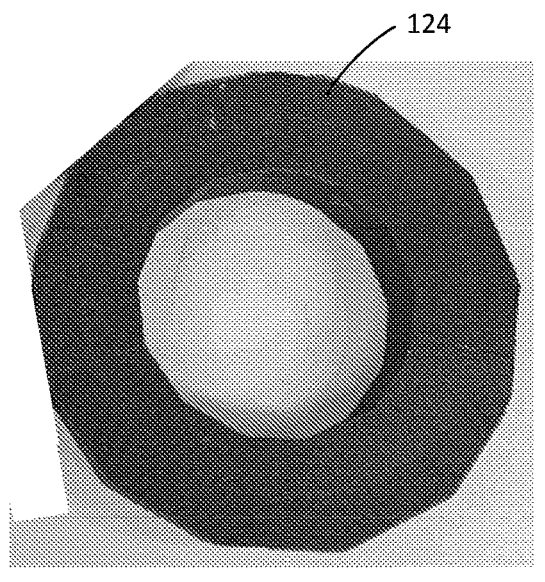
FIG. 5 is a top view of the intermediate component of the flux guide of FIG. 3.
Figure 5:
Figure 6:
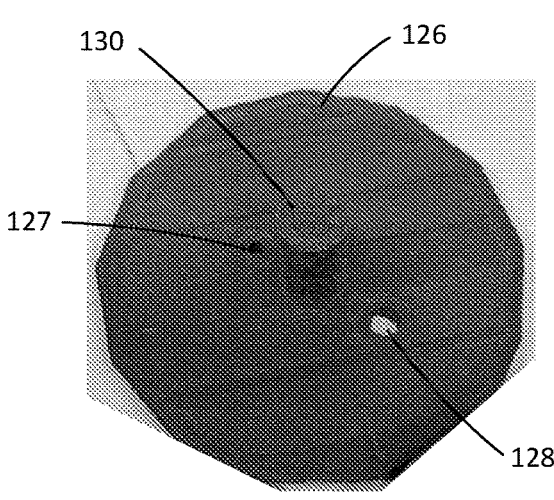
FIG. 6 is a top view of the bottom component of the flux guide of FIG. 3.
Figure 8:
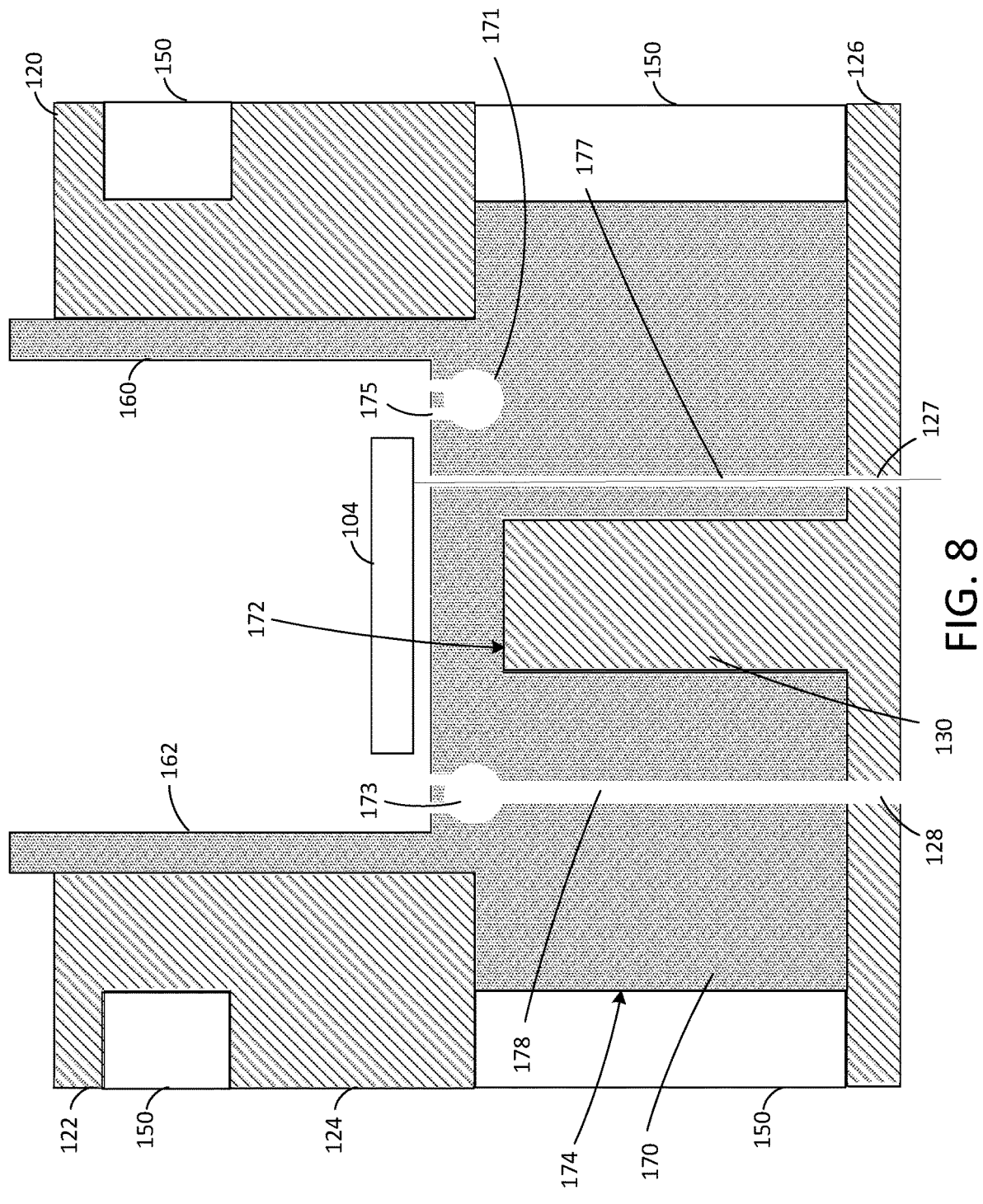
FIG. 8 is a cross-sectional view of another embodiment of a Hall effect thruster.

FIGS. 2 and 3 show an embodiment of an electric propulsion thruster 50 from the propulsion system 10. The electric propulsion thruster can be a Hall effect thruster 100 that can have a central axis A and can include a flux guide 120, a discharge channel 160 with a base 170 that can be used as a propellant distributor and several permanent magnets 150 positioned around the perimeter or circumference of the discharge channel 160. The flux guide 120, as also shown in FIGS. 4-6, can include an upper component (or portion) 122 (see FIG. 4), an intermediate component (or portion) 124 (see FIG. 5) and a bottom component (or portion) 126 (see FIG. 6). While the upper component 122 and the intermediate component 124 are shown as separate components in FIGS. 3-5, the upper component 122 and the intermediate component 124 can be combined into a single, unitary component in another embodiment as shown in FIG. 8.

Figure 7:
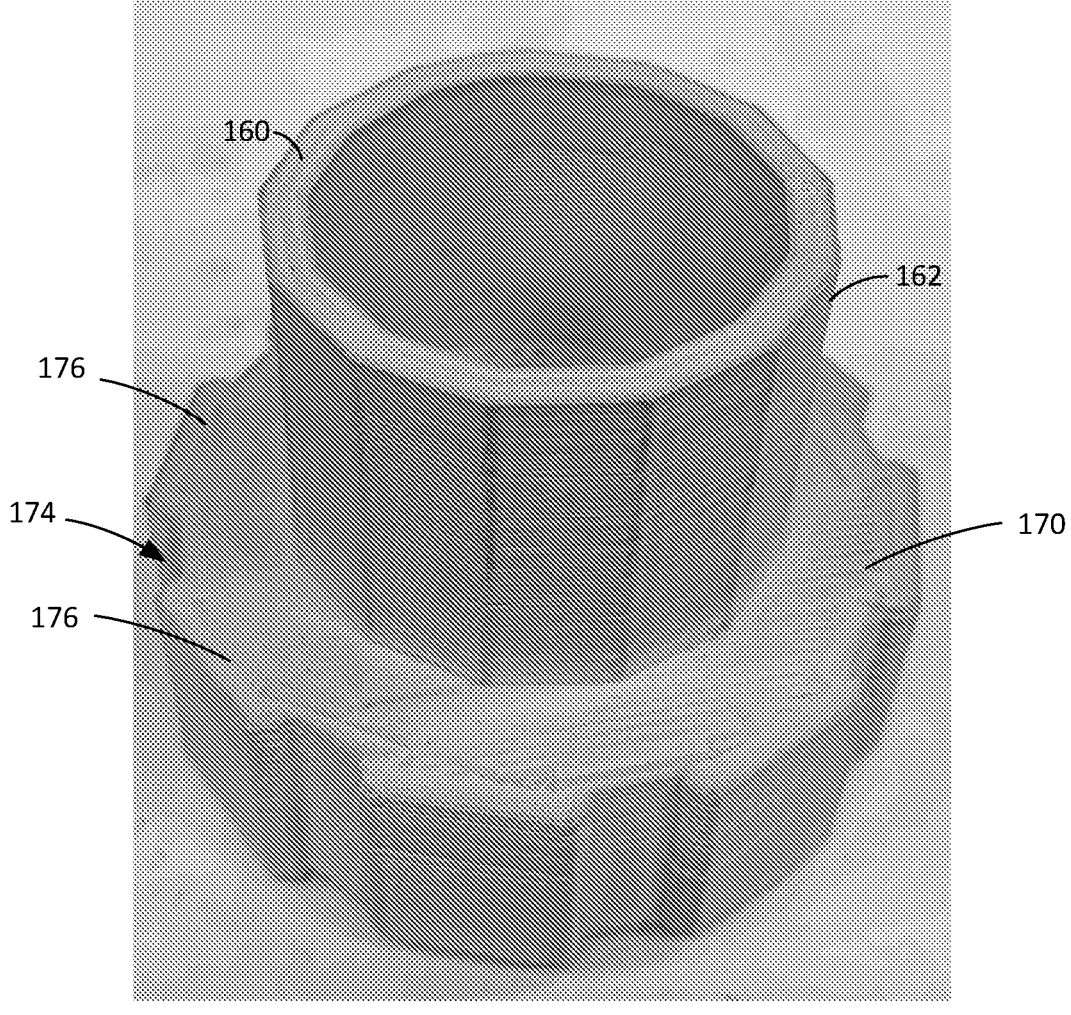
FIG. 7 is a perspective view of the discharge channel of FIG. 3.

The incorporation of the propellant distributor into the base 170 of the discharge channel 160, as also shown in FIG. 7, enables the propellant distributor and discharge channel 160 to be manufactured as a single item or component in one embodiment. However, in other embodiments, the discharge channel 160 and the propellant distributor (or base 170) can be manufactured as separate items or components and connected together as described in U.S. Pat. No. 11,346,330, entitled "Additively Manufactured Components for Electric Propulsion Thrusters and granted on May 31, 2022, which patent is hereby incorporated by reference in its entirety. The base 170 of the discharge channel can be positioned on the bottom component 126 of the flux guide 120. The bottom component 126 of the flux guide 120 can include a cylindrical projection 130 (see FIG. 6) in the center of the bottom component 126 that extends into a cavity 172 (see FIG. 8) of the base 170 when the base 170 is positioned on the bottom component 126. The annular or cylindrical wall portion 162 of the discharge channel 160 can extend from the base 170 to (and possibly beyond) the upper component 122 of the flux guide 120.

The outer perimeter of the base 170 for the discharge channel 160 can include several evenly-distributed grooves, channels or flat cut-outs 174 located between projections 176. A first set of permanent magnets 150 can be positioned in each of the channels 174 between the bottom component 126 and the intermediate component 124. A single magnet may be placed in each channel 174 (as shown in FIG. 3) or multiple magnets (e.g., 3 magnets) may be placed in each channel (as shown in FIG. 2). In one embodiment, the base 170 can have eight (8) channels 174 (each spaced at about 45 degrees) with eight (8) or twenty-four (24) corresponding magnets 150. In other embodiments, the base 170 can have less than eight (8) channels (e.g., six (6) channels spaced at about 60 degrees) or more than eight (8) channels (e.g., twelve (12) channels spaced at about 30 degrees). In still other embodiments, the channels 174 may have an uneven distribution around the perimeter of the base 170.

The intermediate component 124 of the flux guide 120 can be at least partially positioned on the base 170 and can be positioned around (or surround) the outer circumference of the annular wall portion 162 of the discharge channel 160. In an embodiment, the intermediate component 124 can be a hollow cylinder having an inner radius that permits the intermediate component 124 to fit over the annular wall portion 162 of the discharge channel 160. The upper component 122 of the flux guide 120 can be can be positioned around (or surround) the outer circumference of the discharge channel 160. In an embodiment, the upper component 122 can be a hollow cylinder having an inner radius that permits the intermediate component 124 to fit over the annular wall portion 162 of the discharge channel 160. A second set of permanent magnets 150 can be positioned on the perimeter of the flux guide 120 between the upper component 122 and the intermediate component 124. The upper component 122 and/or the intermediate component 124 can incorporate a plurality of projections that are positioned to provide channels or cut-outs for the permanent magnets 150. In one embodiment, eight (8) magnets 150 (each spaced at about 45 degrees) can be positioned between the upper component 122 and the intermediate component 124 around the circumference of the annular wall portion 162 of the discharge channel 160. In other embodiments, less than eight (8) magnets (e.g., six (6) magnets spaced at about 60 degrees) or more than eight (8) magnets (e.g., twelve (12) magnets spaced at about 30 degrees) may be used. In still other embodiments, the magnets 150 may have an uneven distribution between the upper component 122 and the intermediate component 124. In an embodiment, the permanent magnets 150 can be neodymium magnets having an N42 grade (i.e., a maximum energy product of 42 MGOe mega-gauss-oersted)). However, any suitable permanent magnet (e.g., Samarium Cobalt (SmCo)) may be used in other embodiments.

As shown in the embodiment of the Hall effect thruster 100 in FIG. 8, an anode 104 can be positioned within the space of the annular wall portion 162 of the discharge channel 160. In one embodiment, the anode 104 can be a solid disc or ring manufactured from stainless steel. However, the anode 104 can incorporate other configurations (e.g., the anode 104 can be placed inside or along the annular wall portion 162) and materials in other embodiments. The base 170 and the bottom component 126 can each have a corresponding opening and/or passageway for the electrical connection and mounting of the anode 104 in the annular wall portion 162 of the discharge channel 160. The base 170 can include a passageway 177 extending from the bottom component 126 to the discharge channel 160 and the bottom component 126 can include an opening 127 that is aligned with the passageway 177 when the base 170 is positioned on the bottom component 126.

In addition, the base 170 of the discharge channel 160 and the bottom component 126 can each have a corresponding opening and/or passageway to supply propellant to the propellant distributor 171. The base 170 can include a passageway 178 extending from the bottom component 126 to one or more annular distribution passageways 173 of the propellant distributor 171 and the bottom component 126 can include an opening 128 that is aligned with the passageway 178 when the base 170 is positioned on the bottom component 126. The propellant can then flow from the opening 128 in the bottom component 126 via the passageway 178 to the one or more annular distribution passageways 173 of the propellant distributor 171. The annular distribution passageway(s) 173 can then be used to distribute the propellant to discharge holes 175 that supply the propellant from the propellant distributor 171 in the base 170 to the annular wall portion 162 of the discharge channel 160. The discharge holes 175 can be arranged in two concentric rings near the inner surface of the annular wall portion 162 of the discharge channel 160 to provide for a substantially even distribution of propellant into the annular wall portion 162 of the discharge channel 160. In other embodiments, a single ring or more than two (2) rings of discharge holes 175 may be used to provide propellant to the annular wall portion 162 of the discharge channel 160. In another embodiment, the discharge holes 175 can also be placed circumferentially along the inner surface of the annular wall portion 162 of the discharge channel 160 to provide lateral propellant injection or staggered injection into the annular wall portion 162 of the discharge channel 160 as may be dictated by the design and operation of the thruster 100. In a further embodiment, propellant passageways (not shown) can be embedded to flow through the annular wall portion 162 of the discharge channel 160 and the body of the base 170 to provide cooling to the discharge channel 160. In an additional embodiment, thermocouple/sensor ports can be incorporated into the discharge channel 160 for monitoring temperature and other parameters.

In an embodiment, the magnetic flux guide 120 (including the top component 122, the intermediate component 124 and the bottom component 126) can be additively manufactured (or 3D printed) with magnetic material (e.g., iron, nickel, low carbon stainless steel or cobalt) impregnated filament and the discharge channel 160 can be additively manufactured (or 3D printed) with ceramic (e.g., zirconium oxide) impregnated filament. The impregnated filament can be PLA (polylactic acid) filament in one embodiment, but other suitable types of thermoplastic filaments (e.g., acrylonitrile butadiene styrene (ABS), polycarbonate (PC), nylon or polyamide (PA), lignin, or polystyrene (PS)) can be impregnated with ceramic or magnetic material in other embodiments. The ceramic impregnated filament can include between about 25% ceramic to about 85% ceramic. The magnetic material impregnated filament can include between about 25% magnetic material to about 85% magnetic material. For example, a zirconium silicate ceramic filament made by The Virtual Foundry, which is about 55% ceramic, may be used for the discharge channel 160. An iron-filled metal composite PLA from Protopasta, which is about 30% iron by weight, or an iron-filled metal composite PLA from the Virtual Foundry, which is about 80% iron by weight, can be used for the magnetic flux guide 120.

Figure 9:
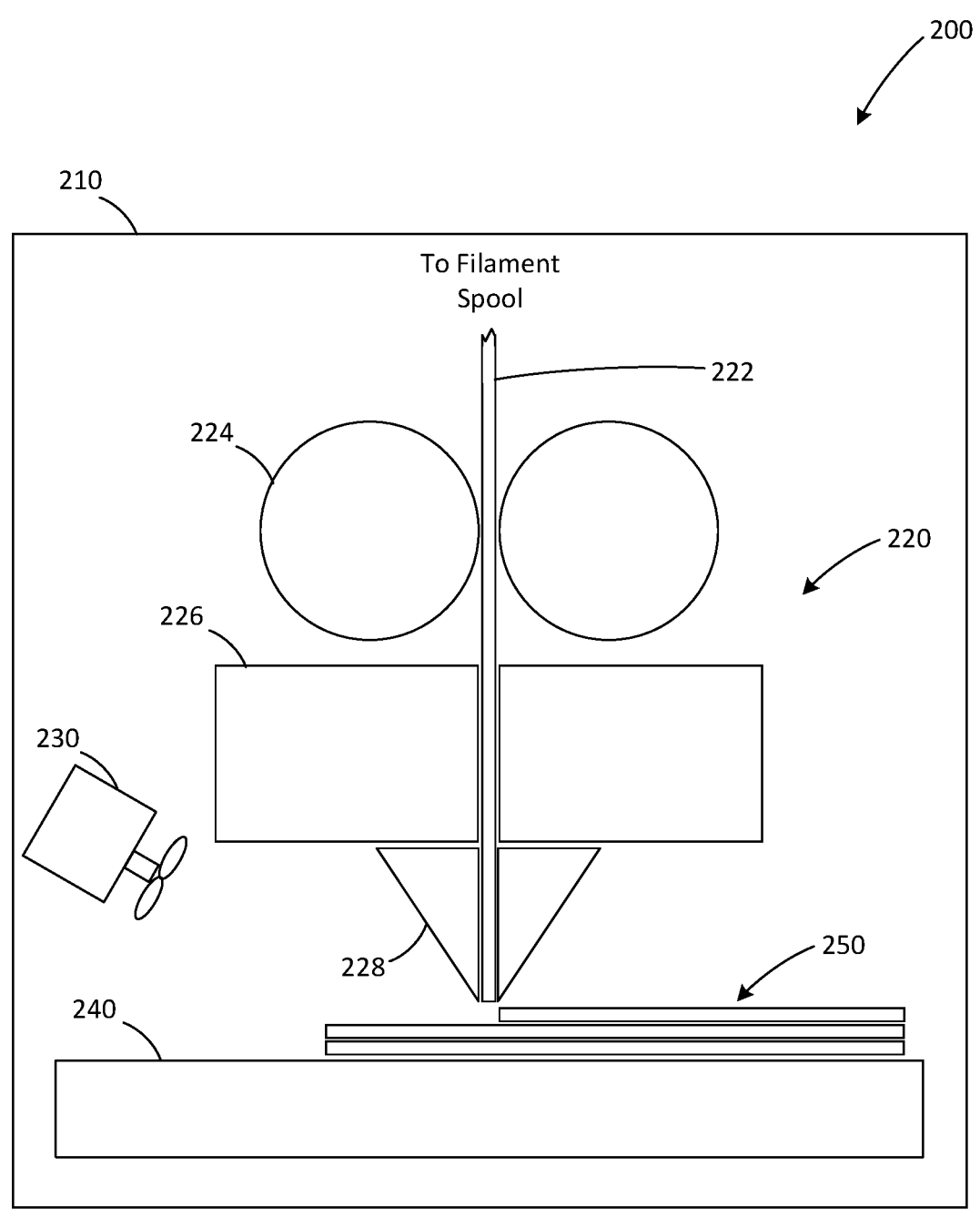
FIG. 9 is a schematic diagram of an embodiment of an additive manufacturing printing system.

FIG. 9 is a schematic diagram of an embodiment of an additive manufacturing printing system that can be used to fabricate the magnetic flux guide 120 and the discharge channel 160. In an embodiment, the 3D (three-dimensional) printer or additive manufacturing system 200 can be used to fabricate the magnetic flux guide 120, the discharge channel 160 and/or other parts of the Hall effect thruster using fused deposition modeling (FDM) or fused filament fabrication (FFF). The system 200 can include an extruder 220 located inside an enclosed case or chamber 210. In one embodiment, the case or chamber 210 may be airtight such that the environment inside the chamber 210 can be controlled (e.g., a vacuum may be generated, an inert gas atmosphere such as nitrogen or argon may be provided or a fixed temperature may be established). However, in other embodiments, the case or chamber 210 may be omitted from the system 200 (i.e., not used by the system 200).

The extruder 220 can use one or more sets of gears or rollers 224 to draw (or unwind) a filament 222 from a spool (not shown). In one embodiment, the gears or rollers 224 may be driven by a stepper motor (or other suitable motor) to control the feed rate or speed at which the filament 220 is drawn (or unwound) from the spool. The filament 222 can then be provided to a heater (or heating chamber) 226 that can heat (and melt) the filament 220 such that the filament 222 can then be extruded by a nozzle 228 as a thin, tacky bead onto a table or platform 240. In an embodiment, the nozzle 228 can have a diameter of between 0.3 mm and 1.0 mm, but other diameter nozzles can be used in other embodiments.

The bead of extruded filament can be applied as a "road" on the table 240 through the movement of the extruder 220 and/or the table 240 to form a layer of the object 250. A solid layer can be generated by following a rasterizing motion that deposits roads side by side within a predefined boundary. The process of applying a road (and forming a layer) can be repeated to form subsequent layers on top of previous layers until the final object 250 has been generated. In an embodiment, when applying a subsequent road or layer to a previous road or layer, the platform 240 can be lowered and/or the extruder 220 can be raised to provide adequate or sufficient space for the application of the subsequent road or layer.

The nozzle 228 can be used to start and stop the extrusion of the filament 222, as needed, to form the corresponding roads and layers used to generate the object 250. In an embodiment, the nozzle 228 can incorporate a heater, either in addition to or in place of heater 226, such that the nozzle 228 can be used for heating and melting of the filament 222. A fan 230 can be used to cool the extruded (and heated) filament 220 on the platform 240 such that the filament 220 can harden to form the object 250. In some embodiments, the extruder 220 can be moved vertically and horizontally (e.g., using stepper motors or servo motors) relative to a fixed platform 240 when printing the object 250. In other embodiments, the platform 240 can be moved vertically and horizontally (e.g., using stepper motors or servo motors) relative to a fixed extruder 220 when printing the object 250. In still other embodiments, both the extruder 220 and the platform 240 can be moved vertically and/or horizontally when printing the object 250.

Figures 10, 11, 12:
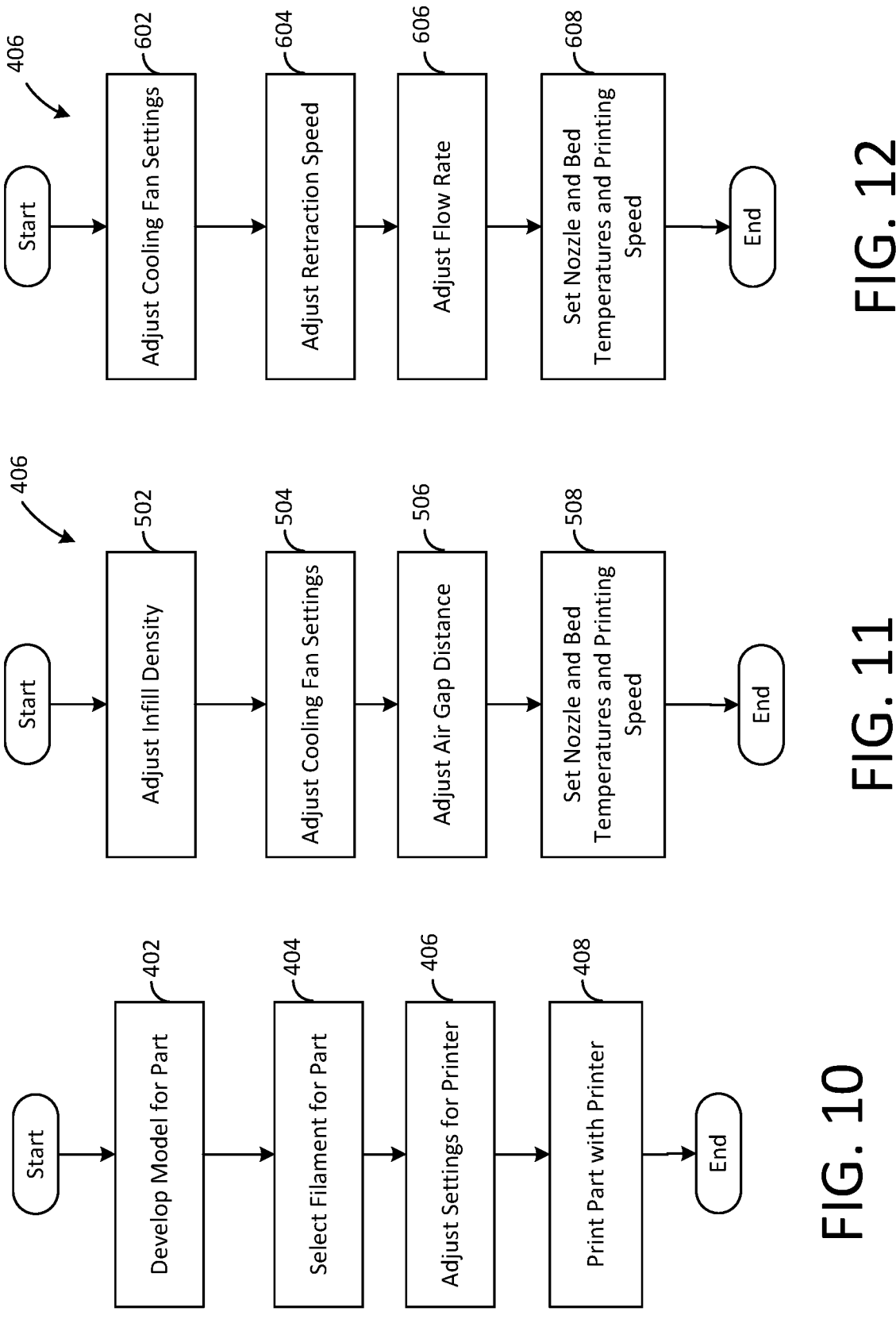
FIG. 10 is a flow diagram for an embodiment of a process for fabricating a component of the Hall effect thruster.
FIG. 11 is a flow diagram for an embodiment of a process for adjusting the printer settings when fabricating a flux guide of the Hall effect thruster.
FIG. 12 is a flow diagram for an embodiment of a process for adjusting the printer settings when fabricating a discharge channel of the Hall effect thruster.

FIG. 10 shows an embodiment of a process for the additive manufacturing of a part of the Hall effect thruster. The process begins with the development of a model for the component or part (e.g., a flux guide or a discharge channel) to be fabricated or printed using additive manufacturing (step 402). In an embodiment, a 3D CAD (computer-aided design) model can be created for each part using Solid Edge. However, in other embodiments, any suitable 3D modeling software can be used to create models of the parts. In some embodiments, after the 3D model has been created, a software process can orient the model for the build process and mathematically slice the model according to the processing parameters selected. Next, the filament (e.g., a magnetic material impregnated filament or a ceramic impregnated filament) is selected for the part to be printed (step 404). Once the filament has been selected for the part to be printed, the settings can be adjusted for the 3D printer 200 (step 406) based on the component or part and the selected filament.

FIG. 11 shows an embodiment of a process associated with step 406 from FIG. 10 to adjust the printer settings for fabricating a flux guide. Printing the flux guide with magnetic material (e.g., iron) impregnated filament requires several settings to be changed compared to printing with conventional plastic. One setting to be changed is the infill density, i.e., the percentage of space inside the part that is filled with filament (step 502). In an embodiment, the infill density can be adjusted from about 10-25%, which can be used for conventional plastic, to 100% to obtain a completely solid part and to obtain strongest possible magnetic field for the flux guide. When printing a solid part (i.e., 100% infill density), the printer must spend more time on each layer (compared to only filling in 15% of the space of the part), which can result in each layer having more time to cool before the next layer is printed over it. When the layers cool, they also shrink and can pull away from the bed causing significant deformations and warping. Thus, another setting to be changed is the operation and speed of the cooling fan (step 504). In an embodiment, the cooling fan can be disabled for the printing of the first few layers of the part to provide a solid base for the part with no shrinking. After the first few layers a printed, the fan can be started (or turned on) and operated at 50% (of the maximum) speed. Operation of the fan at 50% speed can provide for sufficient cooling of the layers of the part. If there is not sufficient cooling of the layers, the weight of the subsequent layers can push down and deform the lower portion (e.g., the initial layers) of the part. In an embodiment, a raft base can be printed that can be about 4 layers high and that provides a layer slightly larger than the part being printed. The raft base can be used to help the printing of the part layers stick to the bed, to help prevent warping of the part layers, and to decrease the risk of damaging the printed part when removing the part from the bed.

When using the raft base for printing the part, the setting for the air gap distance (i.e., the small vertical height that the nozzle travels up in between the base and the part) can be adjusted (step 506) to permit the base to be removed from the part at the conclusion of the print more easily. In an embodiment, the air gap distance can be adjusted from about 2.5 mm, which can be used for conventional plastic printing, to 1 mm when printing the magnetic material impregnated filament. Finally, the nozzle temperature, the bed temperature and the printing speed can be set (step 508). In one embodiment, the nozzle temperature can be about 187° C., the bed temperature can be about 52° C., and the printing speed can be about 25 mm/s.

FIG. 12 shows an embodiment of a process associated with step 406 from FIG. 10 to adjust the printer settings for fabricating a discharge channel. Similar to printing with magnetic material impregnated filament, printing with ceramic impregnated filament requires the change of several settings compared to printing with conventional plastic. One setting to be changed is the operation and speed of the cooling fan (step 602). In contrast to the use of magnetic material impregnated filament, ceramic impregnated filament needs the cooling fan to be on both higher and earlier. The ceramic impregnated filament can be softer (than the magnetic material impregnated filament), especially if the ceramic impregnated filament has sat out for a length of time and absorbed water from the atmosphere. In addition, since the ceramic impregnated filament is a softer material, the filament is more susceptible to "elephant's foot," where the weight of subsequent layers of the print process push down on the first few layers and enlarge the first few layers. In an embodiment, the cooling fan can be operated at 50% speed for the first few layers and then the cooling fan can be operated at 100% speed for the rest of the part.

In addition, the softness of the ceramic impregnated filament requires the retraction speed (i.e., the speed at which the nozzle pulls filament up before traveling across the part to avoid leaving strings) to be altered or adjusted (step 604). A high retraction speed can cause filament grinding in softer filaments, such as ceramic impregnated filaments, where the extrusion gear grinds a notch in the filament. If ground too far, the filament can get to the point where the extrusion gear can no longer get a grip on the filament to extrude the filament. To avoid grinding the filament, the retraction speed for ceramic impregnated filament can be lowered from the conventional 90 mm/s to 50 mm/s in an embodiment. The setting for the flow rate can also be adjusted (step 606) when using ceramic impregnated filament. Since the ceramic impregnated filament can be harder to extrude, the flow rate can be increased to help push more filament through the extruder and helps prevent under-extrusion. In an embodiment, the flow rate can be increased from 100% to 135% when using ceramic impregnated filament. Finally, the nozzle temperature, the bed temperature and the printing speed can be set (step 508). In one embodiment, the nozzle temperature can be about 210° C., the bed temperature can be about 45° C., and the printing speed can be about 25 mm/s.

Figure 13:
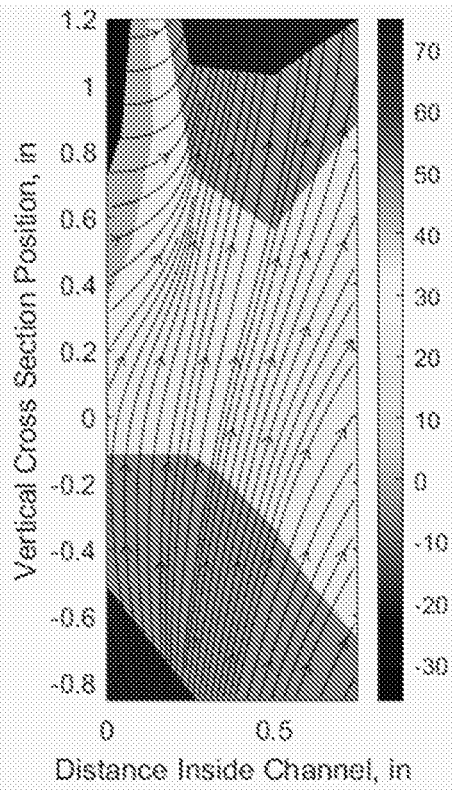
FIG. 13 shows a graph of an embodiment of magnetic field mapping for a Hall effect thruster.

Referring back to FIG. 10, after the printer settings have been adjusted, the part can be printed (step 408) and the process can end. After all the parts for the Hall effect thruster have been printed (i.e., the flux guide and the discharge channel) a magnetic field mapping of the Hall effect thruster can be performed (after adding non-printed components such as the permanent magnets, the anode and the cathode). Measurements for the magnetic field mapping can be taken with both a radial and transverse Gauss probe. The measurements can be taken along a cross section of the Hall effect thruster on a plane that goes through a pair of permanent magnets. The results of a magnetic field mapping in an embodiment are shown in FIG. 13.

The printed Hall effect thruster was tested in the vacuum chamber to evaluate the operating conditions and longevity. The printed Hall effect thruster was fired for over an hour and needed approximately 400 volts and 10 SCCM (standard cubic centimeters per minute) to start. The operating conditions for the anode were 72.5-84 volts, 0.314 Amps, and 5.1 SCCM and for the cathode were 68.5 volts, 0.314 Amps, and 5.2 SCCM. The voltage dropped over time as it was firing, because as the magnets got hotter, the magnets lost some of their magnetism. To address this problem, the magnets could be insulated or heat dissipation techniques (e.g., cooling passages in the discharge channel) can be used to lower the temperature of the magnets. There was no melting of any of the components in the Hall effect thruster.

In other embodiments, the printed parts can also be sintered to obtain 100% magnetic material or 100% ceramic material parts that can bring the "printed" thruster closer to conventional thrusters in terms of magnetic field strength. The sintering of metals or magnetic materials can typically take place at about ¾ (or 75%) of the melting point of the metal or magnetic material. For example, the sintering temperature of iron can be just over 2000° F. However, there are two steps that can be implemented prior to reaching the sintering temperature that can help ensure a stronger part without cracks or deformations. The first set is a debinding step that can heat the part up to around 800° F. to vaporize all of the PLA binder. After the debinding step, the part can hold its shape, but may be very brittle and may be referred to as a brown part. The next step, before sintering, is called a pre-sintering step and can hold the brown part below the sintering temperature to begin the process of neck formation. When the part is allowed to slowly begin forming necks between particles without being hot enough for full neck formation, a stronger part can be formed.

In one embodiment, when sintering a part printed from iron impregnated filament, an alumina crucible can be used along with the Virtual Foundry's Sapphire 3D blend and sintering carbon as a refractory powder. The part can be completely covered in the Sapphire 3D blend leaving space between part edges and crucible walls, then the sintering carbon can be layered on top. With regard to the firing schedule, the debinding and sintering processes can be split up into two separate firings.

The sintering of a part printed from ceramic impregnated filament can be similar to sintering a part printed from magnetic material impregnated filament with a few differences. One difference is that sand can be used in place of the Sapphire 3D blend and refractory powder when filling or packing the alumina crucible. In addition, any holes or cutouts in the part are not be packed with sand, because the presence of the sand may break the part as the part shrinks. Another difference is that the sintering temperature for ceramic impregnated filament, more specifically zirconium silicate impregnated filament, is 2300° F. In addition, the sintering process for ceramic impregnated material may result in shrinkage of the part (e.g., a parts may shrink, on average, to approximately 84% of their original size in all directions). To account for shrinkage, the original model for the part can be scaled up in order to end up with a correctly sized part.

Figure 14:
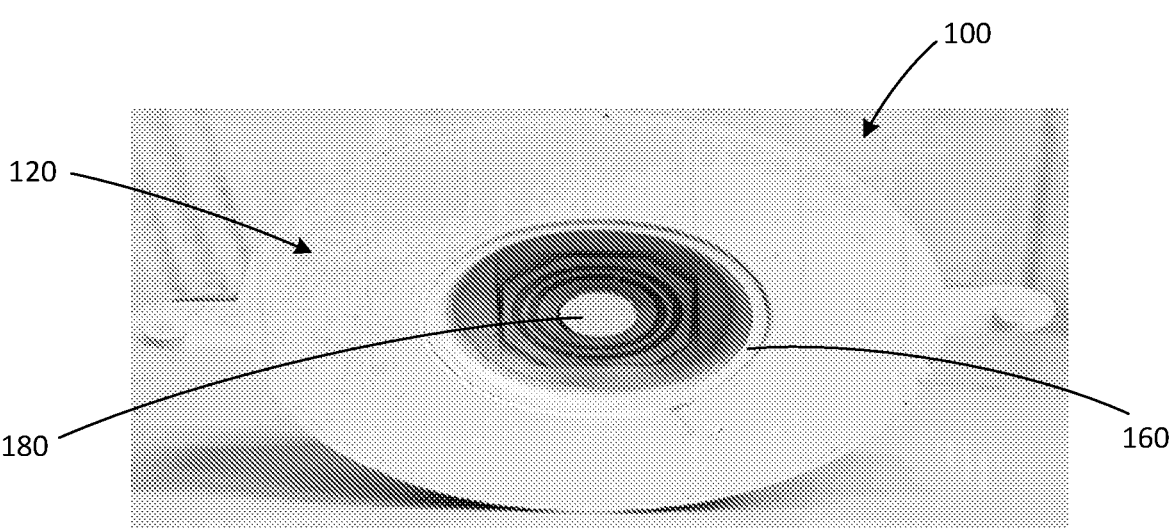
FIG. 14 is an end view of a further embodiment of a Hall effect thruster.
Figure 15:
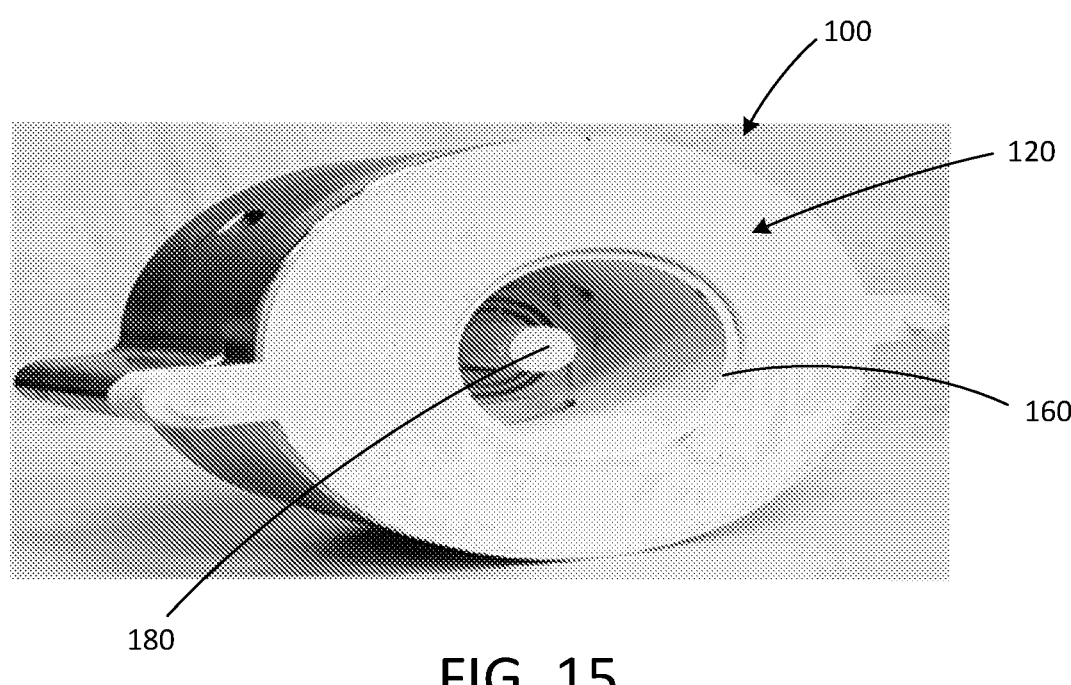
FIG. 15 is a perspective view of the Hall effect thruster from FIG. 14.

In still other embodiments, as shown in FIGS. 14 and 15, the discharge channel 160 can incorporate a center cylinder or pole 180 in the annular wall portion 162 that extends from the base 170 to the opening of the discharge channel 160. The center cylinder 180 can be fabricated from ceramic impregnated filament similar to the fabrication of the discharge channel 160. In some embodiments, one or more permanent magnets can be incorporated inside the center cylinder 180.

In an embodiment, the magnetic flux guide 120 and/or the discharge channel 160 can be fabricated with functionally graded materials to obtain desirable characteristics. Both the magnetic flux guide 120 and the discharge channel 160 can be fabricated to have different percentages of ceramic material or magnetic material at different portions (or volumes) of the component (i.e., functional grading) to obtain desired characteristics. The different percentages of material in different areas can be obtained through different techniques. One way to obtain functional grading is to change the amount of impregnated material in the filament to obtain either a higher percentage (if more impregnated material is incorporated in the filament) of a lower percentage (if less impregnated material is incorporated in the filament) of material in a particular portion of the component. Other ways to obtain functional grading include changing the density of the print (infill density), increasing or decreasing the number of layers, and/or increasing or decreasing the thickness (or layer height) of the layers. For example, thinner layers can increase the layer density and increase the amount of material for a particular volume.

In one embodiment, the magnetic field provided by the permanent magnets 150 can be tailored from the use of functionally graded materials in the magnetic flux guide 120. The controlling of the density of particular portions of the magnetic flux guide 120 can be used to configure the magnetic field from the permanent magnets 150 to provide for improved operation of the Hall effect thruster 100. More specifically, thruster performance can be improved by having the magnetic field lines (from the magnets 150) aligned with (or within) the discharge channel 160. In addition, performance of the Hall effect thruster 100 can be improved by having a higher magnetic field at the exit of the discharge channel 160 and a lower magnetic field by the anode 104. The shape of the magnetic flux guide 120 (e.g., the inclusion of the center post or cylinder 130 on the bottom component 126) can be configured to obtain the desired shape of the magnetic field. The magnetic flux guide 120 can be arranged with the magnets 150 to provide a continuous path for the magnetic field without any breaks in the path. In addition, by incorporating functional grading into the magnetic flux guide 120, the magnetic flux guide 120 can be arranged to emit less or store less magnetic field in one region and emit more or store more magnetic field in a different region based on the amount of magnetic material in the region.

In another embodiment, the discharge channel 160 can be fabricated with functionally grading (or different ceramic materials) in different regions or locations to control the secondary electron emission (SEE) coefficient of the discharge channel 160 to improve the plasma and thruster performance. In a further embodiment, the SEE coefficient of the discharge channel 160 can be further controlled by having regions or locations of the discharge channel 160 incorporate metal (and/or magnetic) materials as metal materials can provide a low SEE coefficient compared to ceramic materials. In yet another embodiment, a filament that is impregnated with both metal and ceramic materials can be used to further tune or control the SEE coefficient or other properties of the discharge channel 160.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A method for manufacturing a Hall effect thruster, the method comprising:

developing a model of a magnetic flux guide of a Hall effect thruster;

selecting a filament to be used to fabricate the magnetic flux guide, wherein the selecting includes selecting a magnetic material impregnated filament for the magnetic flux guide;

identifying a desired shape of a magnetic field generated by the magnetic flux guide;

printing, with an additive manufacturing system, the magnetic flux guide with the selected filament; and causing the printing to incorporate a functional grading into the magnetic flux guide by changing a density of the selected filament used in the printing such that the shape of the magnetic field generated by the magnetic flux guide is tailored to the desired shape.

2. The method of claim 1, wherein the changing the density of the selected filament includes adjusting an infill density of the printing.

3. The method of claim 1, wherein the changing the density of the selected filament includes changing an amount or type of magnetic material impregnated in the selected filament.

4. A method for manufacturing a Hall effect thruster, the method comprising:

developing a model of a component of a Hall effect thruster, wherein the component of the Hall effect thruster includes one of a magnetic flux guide or a discharge channel;

selecting a filament to be used to fabricate the component of the Hall effect thruster, wherein selecting a filament includes selecting a magnetic material impregnated filament for the magnetic flux guide or selecting a ceramic impregnated filament for the discharge channel;

adjusting at least one setting of an additive manufacturing system based on the selected filament for the component of the Hall effect thruster, wherein adjusting at least one setting includes adjusting a print speed of the additive manufacturing system based on the selected filament; and printing, with the additive manufacturing system, the component according to the adjusted at least one setting of the additive manufacturing system with the selected filament, wherein the magnetic material impregnated filament is an iron impregnated filament and the ceramic impregnated filament is a zirconium oxide impregnated filament or a zirconium silicate impregnated filament.

5. The method of claim 1, wherein the magnetic material impregnated filament has about 25% magnetic material to about 85% magnetic material and the ceramic impregnated filament has about 25% ceramic to about 85% ceramic.

6. A method for manufacturing a Hall effect thruster, the method comprising:

developing a model of a component of a Hall effect thruster, wherein the component of the Hall effect thruster includes one of a magnetic flux guide or a discharge channel;

selecting a filament to be used to fabricate the component of the Hall effect thruster, wherein selecting a filament includes selecting a magnetic material impregnated filament for the magnetic flux guide or selecting a ceramic impregnated filament for the discharge channel:

adjusting at least one setting of an additive manufacturing system based on the selected filament for the component of the Hall effect thruster, wherein adjusting at least one setting includes adjusting a print speed of the additive manufacturing system based on the selected filament; and printing, with the additive manufacturing system, the component according to the adjusted at least one setting of the additive manufacturing system with the selected filament, wherein the magnetic material impregnated filament has about 25% magnetic material to about 85% magnetic material, wherein the ceramic impregnated filament has about 25% ceramic to about 85% ceramic, wherein the magnetic material impregnated filament has about 80% iron, and wherein the ceramic impregnated filament has about 55% zirconium silicate.

7. The method of claim 1, further comprising applying a sintering process to the magnetic flux guide.

* * * * *